(12) United States Patent
Welch

(10) Patent No.: US 7,198,294 B2
(45) Date of Patent: Apr. 3, 2007

(54) MOTOR VEHICLES INCORPORATING DEPLOYABLE ROLL BAR ASSEMBLIES

(75) Inventor: Martin Welch, Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/258,853

(22) Filed: Oct. 26, 2005

(65) Prior Publication Data

US 2006/0097499 A1    May 11, 2006

(30) Foreign Application Priority Data

Oct. 26, 2004    (GB)    ................ 0423709.5

(51) Int. Cl.
*B60R 21/13*    (2006.01)
(52) U.S. Cl. ............. 280/756; 280/751; 280/753
(58) Field of Classification Search ............ 280/751, 280/753, 756; 180/271; B60R 21/13
See application file for complete search history.

(56) References Cited

U.S. PATENT DOCUMENTS

| | | | | |
|---|---|---|---|---|
| 5,056,816 A | * | 10/1991 | Lutze et al. | 280/751 |
| 5,094,478 A | * | 3/1992 | Pfanzeder et al. | 280/756 |
| 5,205,585 A | * | 4/1993 | Reuber et al. | 280/753 |
| 5,458,396 A | * | 10/1995 | Rost | 297/216.12 |
| 5,626,361 A | | 5/1997 | Heiner | |
| 5,927,803 A | * | 7/1999 | Hehl et al. | 297/216.12 |
| 6,352,285 B1 | * | 3/2002 | Schulte et al. | 280/756 |
| 2003/0001733 A1 | * | 1/2003 | Huang | 340/442 |
| 2005/0082808 A1 | * | 4/2005 | Wildig et al. | 280/756 |

FOREIGN PATENT DOCUMENTS

| | | |
|---|---|---|
| DE | 4426733 A1 | 8/1993 |
| EP | 1127751 A1 | 2/2001 |
| EP | 0952042 B1 * | 8/2003 |
| EP | 0976621 B1 * | 9/2004 |
| EP | 1304266 B1 * | 9/2004 |
| FR | 2845047 | 9/2002 |
| GB | 2157543 A * | 10/1985 |
| GB | 2203706 A * | 10/1988 |
| WO | WO 00/55015 * | 9/2000 |

* cited by examiner

*Primary Examiner*—Ruth Ilan
*Assistant Examiner*—Barry Gooden, Jr.
(74) *Attorney, Agent, or Firm*—Gigette M. Bejin

(57) ABSTRACT

A roll bar assembly capable of punching through a rear window (12) on deployment comprises a deployable u-shaped roll bar (1) fitted with a pin (4) made of hard material. An item of trim (5) is located over the top of the roll bar (1) by means of a pair of spring clips (7,8). The clips are held under tension so that when the bar is deployed, they snap snugly around the bar, releasing stored energy which assists in the bar's deployment. The trim (5) is further provided with an orifice (6) through which the pin can protrude on the deployment of the bar thereby enabling the pin (4) to contact the rear window (12) and to shatter the glass.

5 Claims, 5 Drawing Sheets

MOTOR VEHICLES INCORPORATING DEPLOYABLE ROLL BAR ASSEMBLIES

BACKGROUND OF THE INVENTION

This invention relates to motor vehicles incorporating deployable roll bar assemblies and particularly to convertible motor vehicles having a rear window made of glass.

Applicants co-pending application EP 04254627.7 describes a deployable roll bar assembly capable of shattering a vehicle's rear window on deployment. The assembly includes a hollow inverted U-shaped roll bar which is retained in a housing by a spring-loaded mechanism. The housing may be fixed to a rear bulkhead of the vehicle. The bar is fitted with one or two pins on its upper surface. The pins are fixed to the roll bar by means of a threaded joint. A protruding part of the pin may have a conical, frusto-conical, or domed shape. Such shapes have been found to break a glass window satisfactorily, causing it to shatter into small pieces. The protruding part of the pin is made from a hard material e.g. tungsten carbide.

When a vehicle motion sensor detects that rollover of the vehicle is imminent, the spring-loaded mechanism is released. Consequently, the roll bar is rapidly deployed upwards towards the rear window, whereupon at least one of the pins strikes the window causing it to shatter into many fragments. Once the roll bar is deployed to its fullest extent, it locks in position just beyond the roof line and clear of the head of any occupants, thus affording the necessary protection.

The assembly described in EP 04254627.7 further provides an item of trim, which may be frangible or removable, and located over the roll bar's upper surface to prevent the pins from causing any damage to passengers or items of clothing or luggage. In the case where a frangible item of trim is used, the roll bar is required to break through the trim item as it progresses on its way towards the rear window. Thus, energy is expended in breaking the trim item. In the alternative case where a removable item of trim is used, the roll bar is required to push the trim item out of the way as it progresses towards the rear window. This puts design constraints on the trim item and on the vehicle interior as it must be ensured that the trim item will not become lodged between the roll bar's upper surface and any part of the vehicle in a way that could prevent the pin from hitting the rear window. Furthermore, as in the case off the frangible trim item, energy is expended in forcing the trim item out of the way. This puts an additional performance requirement on the roll bar release mechanism.

Hence it would be advantageous to provide a deployable roll bar and trim assembly which did not suffer from the above-mentioned drawbacks.

SUMMARY OF THE INVENTION

According to the invention there is provided a motor vehicle incorporating a deployable roll bar assembly including; a deployable roll bar having a protruding pin on an upper surface thereof, a first trim item fixed with respect to the motor vehicle for supporting a second trim item which comprises a cover for an upper portion of the roll bar and being movable with respect to the motor vehicle, and incorporating an orifice for receiving the pin and at least one spring-loaded circular clip for location around the roll bar's upper portion, the clip being held under tension by the relative position of the first trim item and the second trim item, whereby in use, on deployment of the roll bar, the upper portion thereof moves towards the second trim item until the pin protrudes through the orifice and the tension on the spring clip is relieved, whereupon the clip clamps around the roll bar and the cover continues to move with the roll bar towards a rear window of the vehicle.

By virtue of the invention, deployment of the roll bar is assisted by the use of the stored energy in the spring clip.

The pin may have a conical or frusto-conical form or may be dome-shaped.

Preferably, the pin is located on the roll bar so that it is closer to the outboard side of the vehicle rather than the inboard side in order to ensure that on deployment, the pin makes contact with the rear window before any other part of the bar.

Preferably, the second trim item is provided with two spring-loaded circular clips, one either side of the orifice, to aid stability of the item.

The second trim item may be made from plastics and have its outer surface covered with leather or a similar material.

Preferably, the clip is made from spring steel and may be bonded and then ultrasonically welded to the second trim item.

The assembly may be located on the rear bulkhead of the vehicle.

BRIEF DESCRIPTION OF THE DRAWINGS

An embodiment of the invention will now be described, by way of example only, with reference to the drawings of which.

DETAILED DESCRIPTION OF THE PREFERRED EMBODIMENTS

Figure 1:
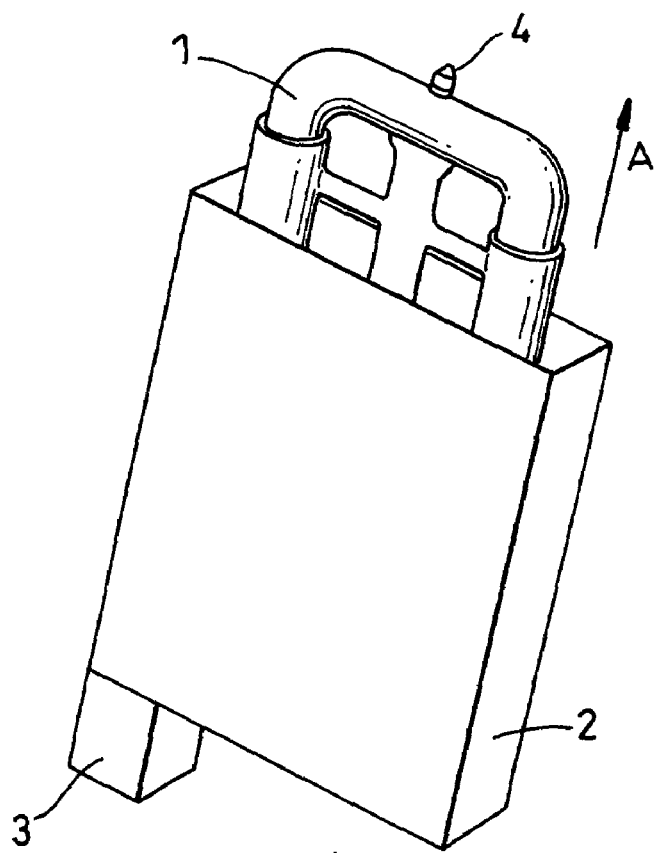
FIG. 1 is a perspective view of a deployable roll bar.

In FIG. 1 a hollow, inverted U-shaped roll bar 1 co-operates with a roll bar release mechanism 2 (whose housing alone is shown in FIG. 1 for the sake of sake of clarity). In this example the release mechanism is a spring-loaded arrangement. (Alternatively, the spring-loaded arrangement could be replaced with a pyrotechnic mechanism). The release mechanism is activated by a release device 3 which in this example is a solenoid switch. (As an alternative, a pyrotechnic actuator could be used).

The roll bar 1, spring-loaded arrangement 2 and solenoid switch 3 operate in a known manner i.e. when a remotely-generated trigger signal is received by the solenoid switch 3, the switch activates the release mechanism 2 and as a consequence, the roll bar 1 is deployed upwards and out of the housing 2 (in the direction off arrow A). Conventional locking means (not shown) prevent the roll bar 1 from moving any further or from being pushed back into the housing by any external force once the roll bar 1 has reached its fully deployed position.

The roll bar 1 is fitted with a pin 4 on its upper surface and closer to one shoulder of the roll bar than the other. The pin 4 consists of a threaded portion, and integral lock nut and an end portion having a conical form. The threaded portion co-operates with a tapped hole in the upper surface of the roll bar. The threaded portion and lock nut are made of steel and the end portion is composed of tungsten carbide and bonded to the lock nut using a suitable epoxy resin adhesive.

Figure 2:
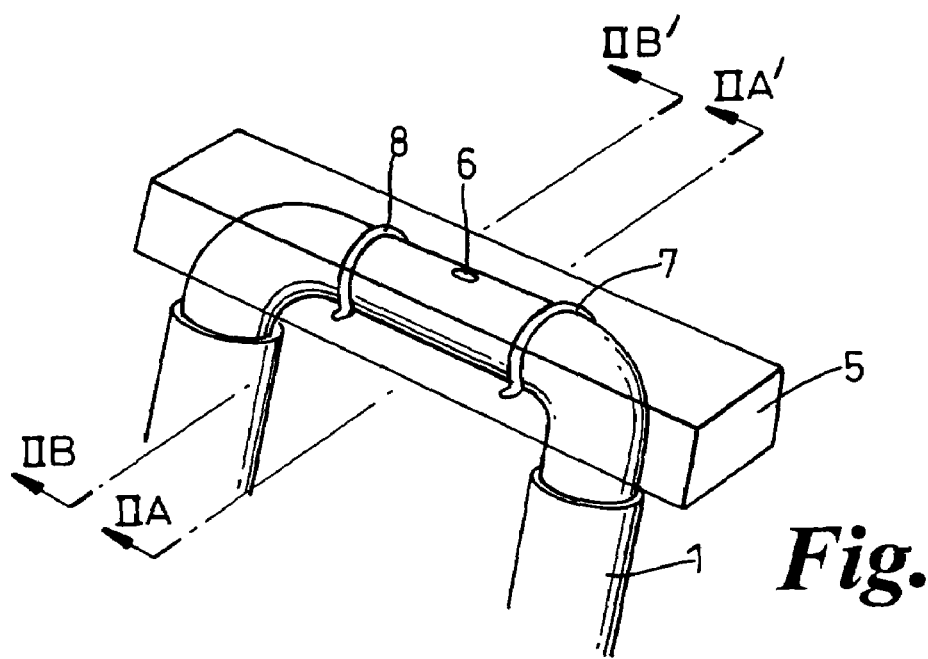
FIG. 2 is a schematic, perspective view of part of a roll bar assembly in accordance with an embodiment of the invention.
Figure 3A:
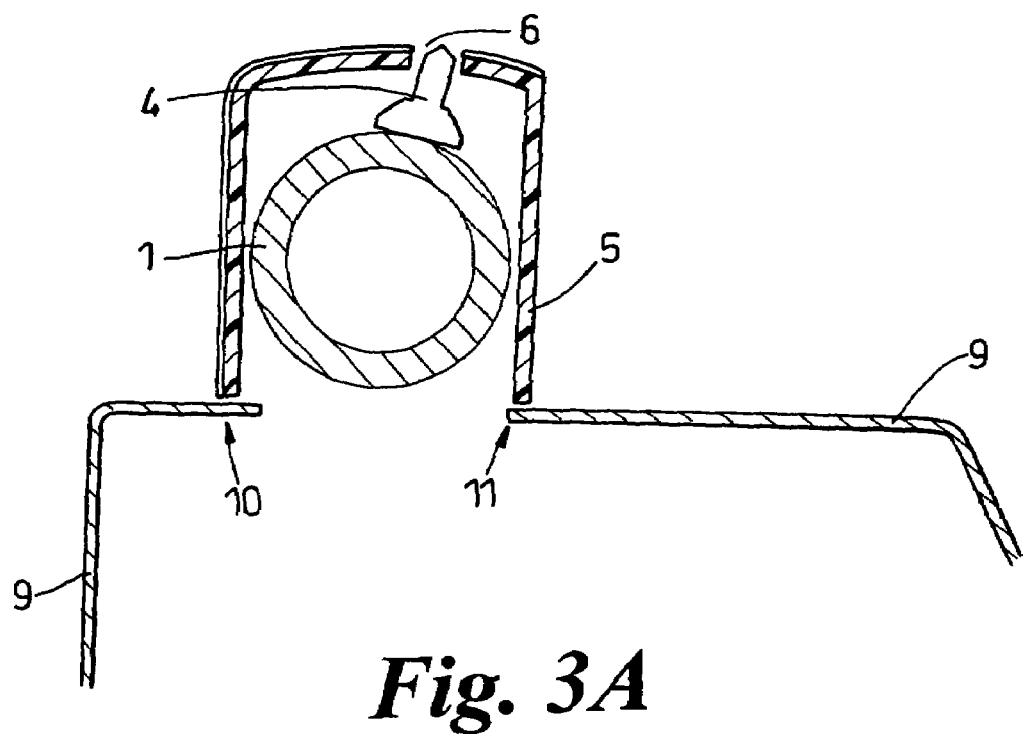
FIGS. 3A and 3B are cross-sectional views along lines IIA–IIA' and IIB–IIB' respectively of FIG. 2 prior to deployment of the roll bar assembly.
Figure 3B:
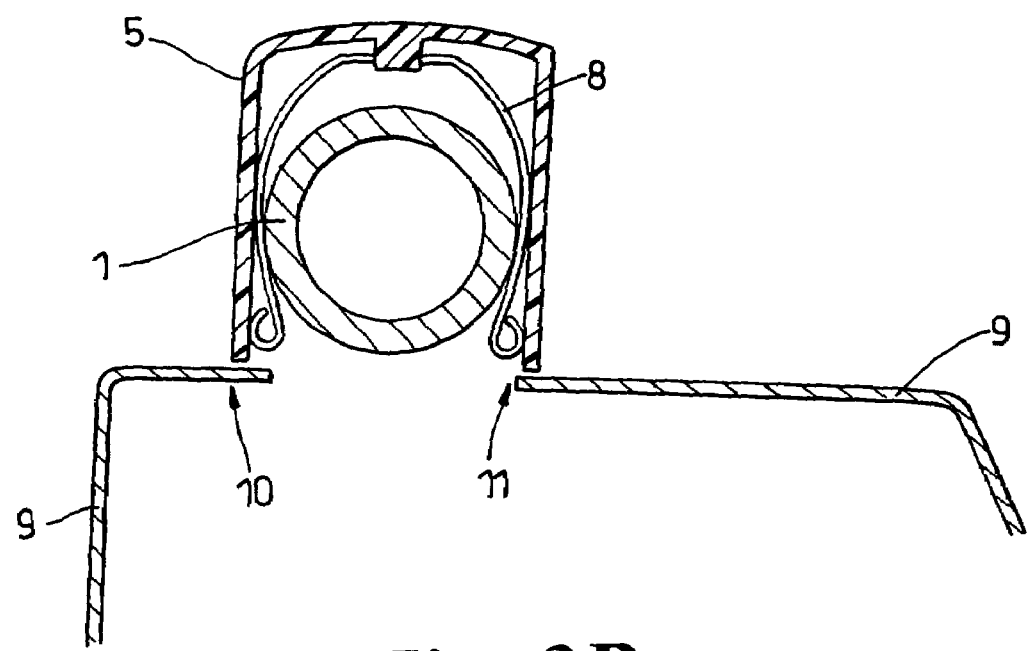

FIG. 2 shows a plastics cover 5 (shown as being transparent, for the sake of clarity) which fits over the roll bar 1. The cover 5 has an inverted U-channel shape and incorporates a hole 6 aligned with the pin 4. Two spring-loaded circular clips 7, 8, made from spring steel, are positioned on either side of the hole 6 and are bonded and ultrasonically welded to the inner surface of the cover 5.

Cross-sectional views 3A, 3B show the positions of the pin 4 and the clip 8 prior to the deployment of the roll bar 1. The cover 5 rests on trim 9 connected to the vehicle bulkhead. The cover 5 is supported at points 10 and 11 so that the pin 4 does not protrude through the hole 6 (and so the pin does not present a hazard to vehicle occupants) and so that the clips grip the roll bar 1 but do not completely close around it, therefore being held under tension.

Figure 4A:
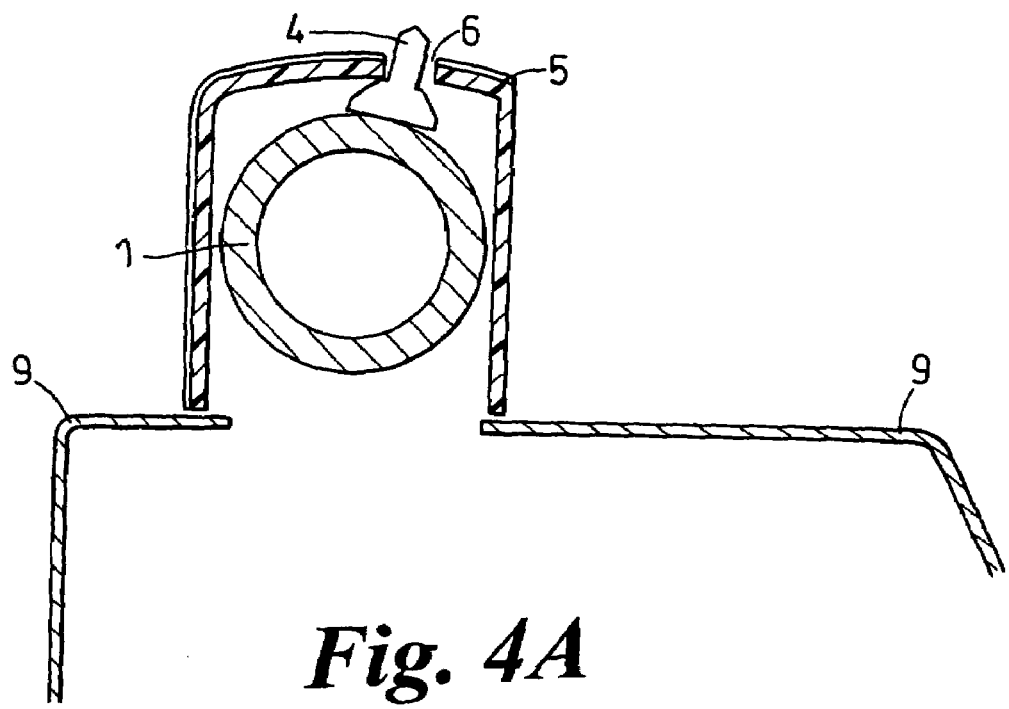
FIGS. 4A, 4B, and 4C are cross-sectional views along lines IIA–IIA', IIB–IIB', and IIA–IIA' respectively of FIG. 2 on deployment of the roll bar.
Figure 4B:
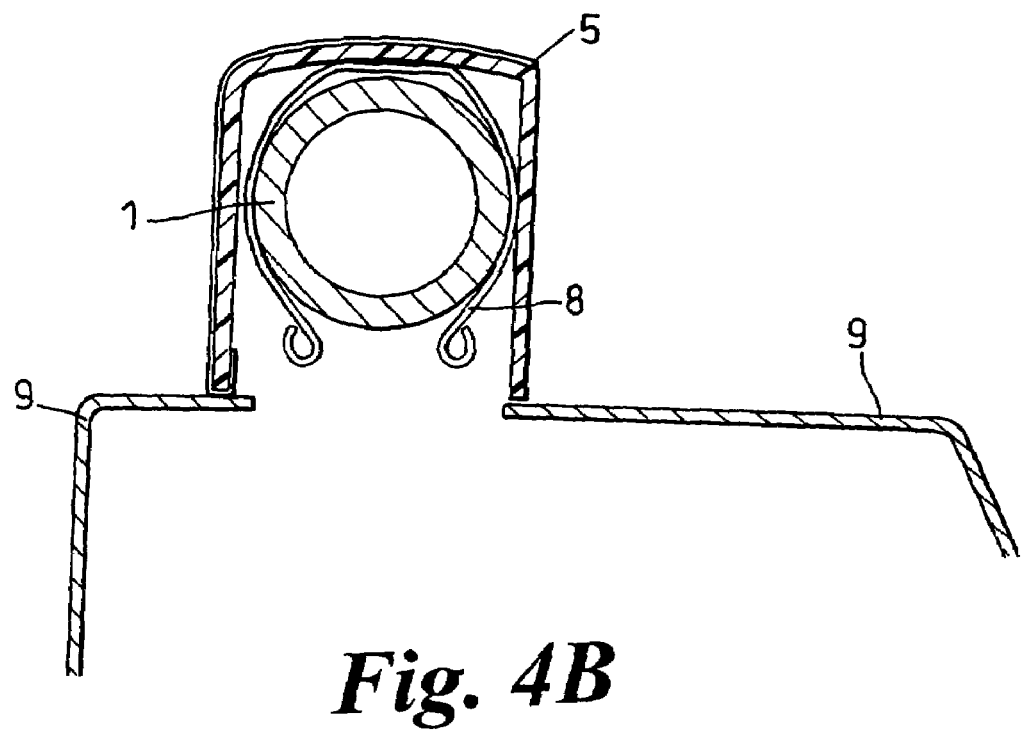
Figure 4C:
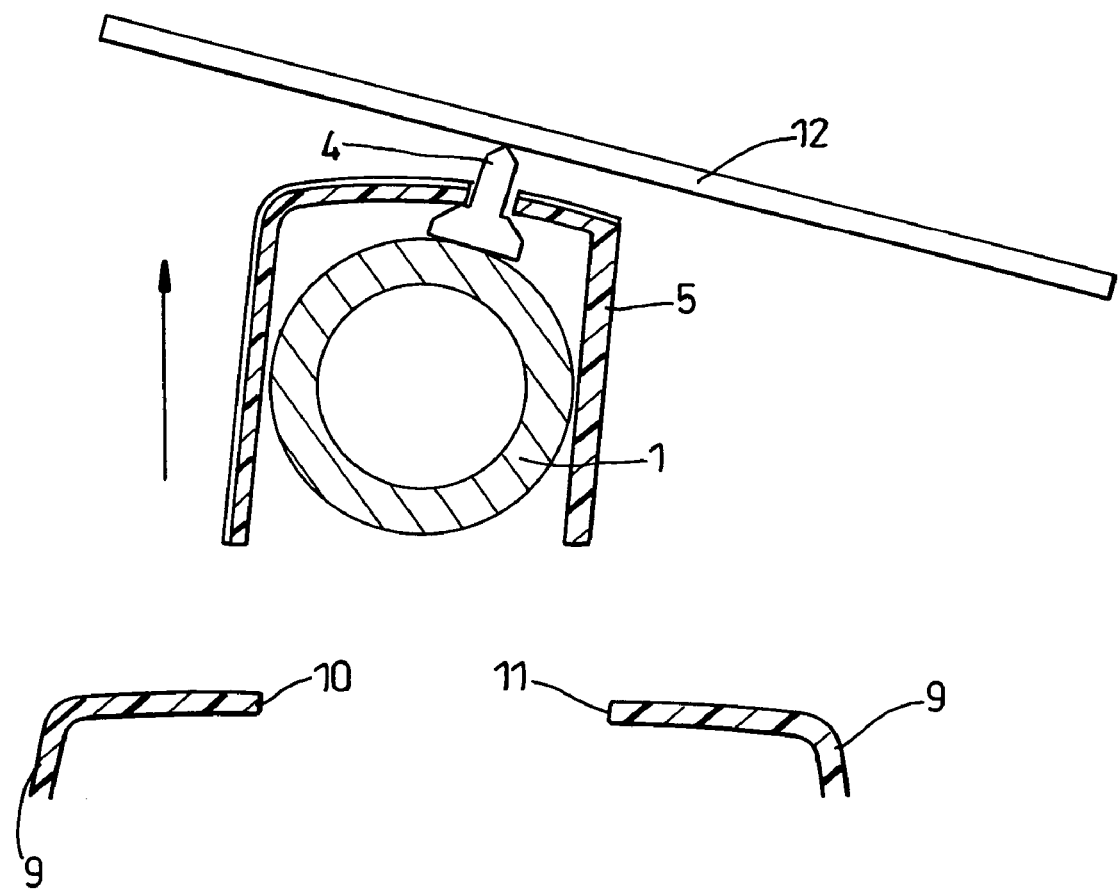

FIGS. 4A 4B and 4C illustrate relative movement of the components of the assembly on the deployment of the roll bar 1. After the release mechanism has been activated, the roll bar 1 moves upwards, towards the inner surface of the cover 5. Hence, the pin 4 protrudes through the hole 6 (FIG. 4A). At the same time, the clips 7, 8 snap into place around the bar 1 (FIG. 4B), releasing stored energy. Now the bar 1 and cover 5 move together upwards and away from the support points 10, 11 and pin 4 can strike the rear window 12 of a vehicle (FIG. 4C).

Figure 5A:
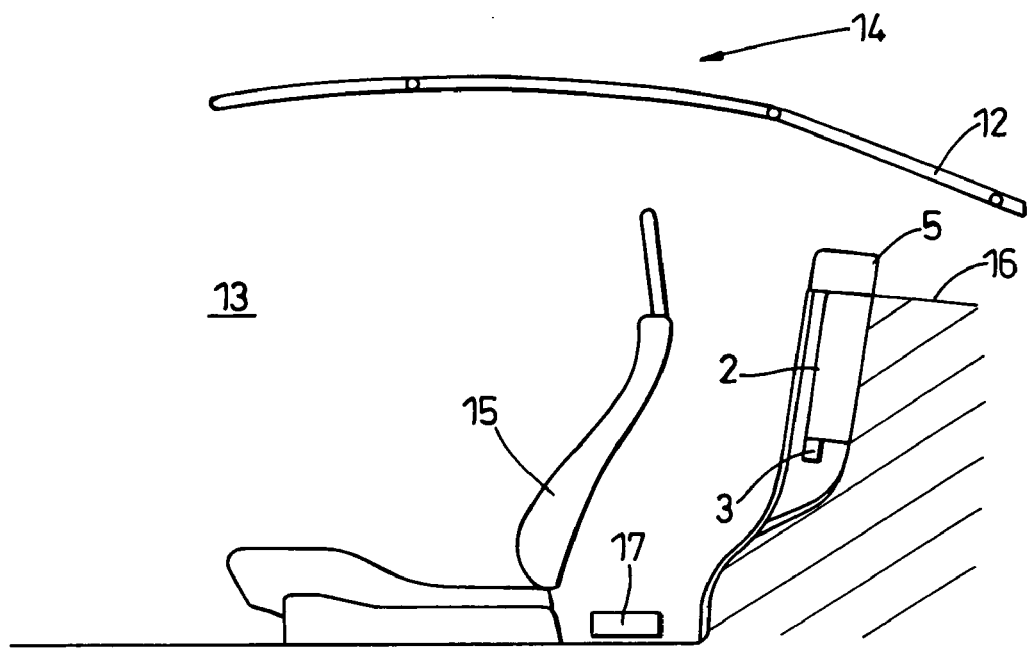
FIGS. 5A and 5B are schematic, perspective views of a roll bar assembly in accordance with an embodiment of the invention and installed in a motor vehicle.

With reference now to FIG. 5A the roll bar arrangement of FIGS. 1 to 4 is shown incorporated in a convertible vehicle 13 which includes a removable or folding roof 14 incorporating rear window 12 made of glass, a seat 15 and rear bulkhead 16. The rest of the vehicle is omitted for the sake of clarity. The roll-bar arrangement of FIGS. 1 to 4 is secured to the rear bulkhead 9 behind the seat 15. Also fitted to the vehicle is a vehicle motion sensor 17, of conventional design, whose electrical output (not shown) is connected to the solenoid switch 3.

The cover 5 is positioned over the roll bar and supported on the bulkhead 16, hiding the roll bar 1 from view whilst in its un-deployed position.

Figure 5B:
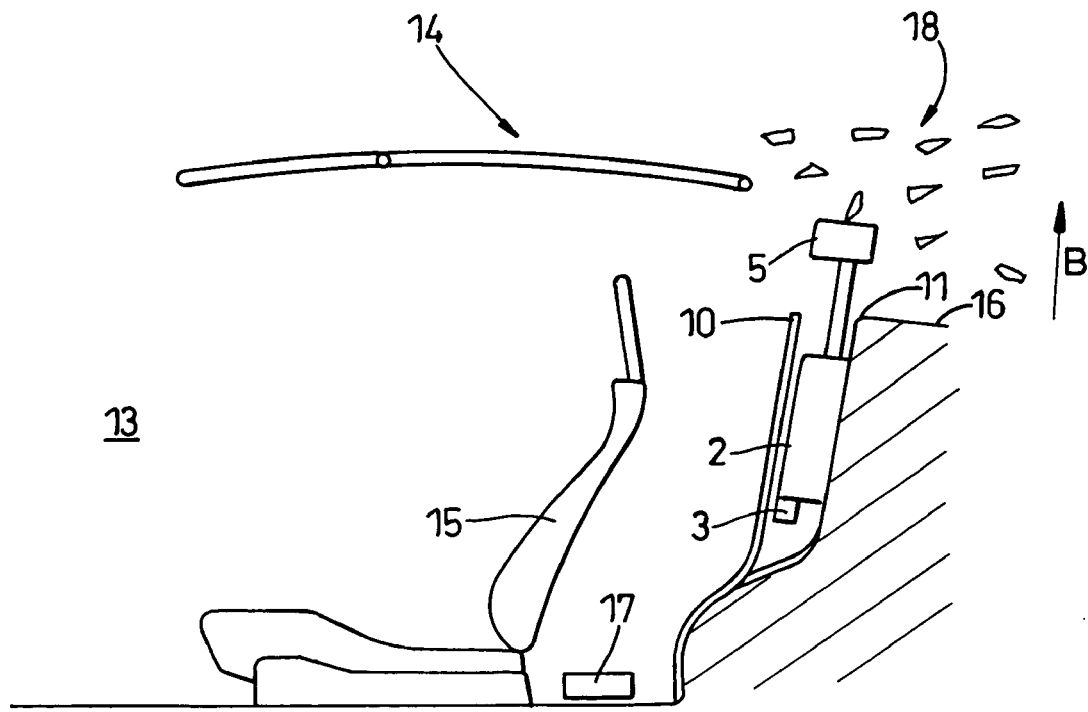

Operation of the embodiment of FIG. 5A will now be described with particular reference to FIG. 5B.

When the vehicle motion sensor 17 detects that rollover of the vehicle 13 is imminent, it transmits a trigger signal to the solenoid switch 3 which in turn, activates the release mechanism 2. Consequently, the roll bar 1 and cover 5 are rapidly deployed upwards (in the direction of arrow B). As the roll bar 1 deploys, the pin 4 protrudes through the hole in the cover and finally strikes the window causing the latter to shatter into many fragments 18. Once the roll bar 1 is deployed to its fullest extent, it locks in position just beyond the roof line as defined by the profile of the rear window 12 and clear of the head of any occupant of the seat 15, thus affording the necessary protection.

What is claimed is:

1. A motor vehicle including; a deployable roll bar having a protruding pin on an upper surface thereof, and first and second trim items, a first trim item being fixed with respect to the motor vehicle for supporting a second trim item which comprises a cover for an upper portion of the roll bar and being movable with respect to the motor vehicle, and incorporating an orifice, for receiving the pin, and at least one spring-loaded circular clip for location around the roll bar's upper portion, the clip being held under tension by the relative position of the first trim item and the second trim item, whereby in use, on deployment of the roll bar, the upper portion thereof moves towards the second trim item until the pin protrudes through the orifice and the tension on the spring clip is relieved, whereupon the clip clamps around the roll bar and the cover continues to move with the roll bar towards a rear window of the vehicle.

2. A motor vehicle according to claim 1 in which the pin has a conical form.

3. A motor vehicle according to claim 1 in which the second trim item is provided with two spring-loaded circular clips, one on either side of the orifice.

4. A motor vehicle according to claim 1 in which the second trim item is made from plastics.

5. A motor vehicle according to claim 1 in which the spring-loaded circular clip is made from spring steel.

* * * * *